US006451264B1

(12) United States Patent
Bhullar et al.

(10) Patent No.: US 6,451,264 B1
(45) Date of Patent: Sep. 17, 2002

(54) FLUID FLOW CONTROL IN CURVED CAPILLARY CHANNELS

(75) Inventors: Raghbir Singh Bhullar, Indianapolis; Jeffrey N. Shelton, Fishers, both of IN (US); Wolfgang O. L. Reiser, Mannheim (DE)

(73) Assignee: Roche Diagnostics Corporation, Indianapolis, IN (US)

( * ) Notice: Subject to any disclaimer, the term of this patent is extended or adjusted under 35 U.S.C. 154(b) by 0 days.

(21) Appl. No.: 09/493,883

(22) Filed: Jan. 28, 2000

(51) Int. Cl.[7] ............................ B01L 3/02; B01L 11/00; B01L 3/00; B01D 57/02; B01D 59/42; B01D 59/50; C02F 1/40; C02F 11/00

(52) U.S. Cl. ....................... 422/100; 422/101; 422/102; 422/99; 204/600; 204/601; 204/451; 204/454

(58) Field of Search ................................ 422/100, 101, 422/102, 99; 204/451, 454, 600, 601

(56) References Cited

U.S. PATENT DOCUMENTS

| | | | |
|---|---|---|---|
| 4,233,029 | A | 11/1980 | Columbus |
| 4,271,119 | A | 6/1981 | Columbus |
| 4,302,313 | A | 11/1981 | Columbus |
| 4,310,399 | A | 1/1982 | Columbus |
| 4,426,451 | A | 1/1984 | Columbus |
| 4,439,526 | A | 3/1984 | Columbus |
| 4,473,457 | A | 9/1984 | Columbus |
| 4,549,952 | A | 10/1985 | Columbus |
| 4,618,476 | A | 10/1986 | Columbus |

(List continued on next page.)

FOREIGN PATENT DOCUMENTS

| | | | |
|---|---|---|---|
| EP | 0 348 006 | 6/1988 | ............. B01L/3/00 |
| EP | 0 289 269 A2 | 11/1988 | |
| EP | 0 388 782 A1 | 9/1990 | |
| EP | 0 408 222 A1 | 1/1991 | |
| EP | 0 408 223 A1 | 1/1991 | |
| WO | WO 00/60352 | 10/2000 | |

*Primary Examiner*—Jill Warden
*Assistant Examiner*—Brian R. Gordon
(74) *Attorney, Agent, or Firm*—Brinks Hofer Gilson & Lione

(57) ABSTRACT

A capillary pathway is dimensioned so that the driving force for the movement of liquid through the capillary pathway arises from capillary pressure. A plurality of groups of microstructures are fixed in the capillary pathway within discrete segments of the pathway for facilitating the transport of a liquid around curved portions of pathway. Capillary channels can be coupled between two adjacent groups of microstructures to either the inner and outer wall of the capillary pathway. The width of each capillary channel is generally smaller than the capillary pathway to which it is connected, and can be varied to achieve differences in fill initiation. The grouped microstructures are spaced from each other within each group on a nearest neighbor basis by less than that necessary to achieve capillary flow of liquid with each group. Each group of microstructures are spaced from any adjacent group by an inter-group space greater than the width of any adjacent capillary channels connected to the capillary pathway. Generally, the microstructures are centered on centers which are equally spaced from each other, and microstructures that are located closer to the inner wall of any curve in the capillary pathway are generally smaller than the microstructures located closer to the outer wall. This combination of structural features causes fluids to flow through the capillary pathway so that the rate of flow is somewhat non-uniform as the fluid travels around curved portions of the capillary pathway, the meniscus appearing to pause momentarily at each inter-group space, the flow being somewhat slower near the inner wall of a curved portion than near the outer wall.

23 Claims, 5 Drawing Sheets

U.S. PATENT DOCUMENTS

| | | | | | |
|---|---|---|---|---|---|
| 4,753,776 | A | | 6/1988 | Hillman et al. | |
| 4,756,884 | A | | 7/1988 | Hillman et al. | |
| 4,849,340 | A | * | 7/1989 | Oberhardt | |
| 4,948,961 | A | * | 8/1990 | Hillman et al. | |
| 4,957,582 | A | * | 9/1990 | Columbus | |
| 4,963,498 | A | * | 10/1990 | Hillman et al. | |
| 5,004,923 | A | * | 4/1991 | Hillman et al. | |
| 5,039,617 | A | * | 8/1991 | McDonald et al. | |
| 5,135,716 | A | * | 8/1992 | Hillman et al. | |
| 5,140,161 | A | * | 8/1992 | Hillman et al. | |
| 5,144,139 | A | * | 9/1992 | Hillman et al. | |
| 5,164,598 | A | * | 11/1992 | Hillman et al. | |
| 5,204,525 | A | * | 4/1993 | Hillman et al. | |
| 5,230,866 | A | | 7/1993 | Shartle et al. | |
| 5,300,779 | A | | 4/1994 | Hillman et al. | |
| 5,418,142 | A | | 5/1995 | Kiser et al. | |
| 5,540,888 | A | | 7/1996 | Bunce et al. | |
| 5,620,863 | A | | 4/1997 | Tomasco et al. | |
| 5,637,458 | A | * | 6/1997 | Frankel et al. | 435/6 |
| 5,658,444 | A | | 8/1997 | Black et al. | |
| 5,798,031 | A | | 8/1998 | Charlton et al. | |
| 5,837,115 | A | * | 11/1998 | Austin et al. | 204/450 |
| 5,869,004 | A | | 2/1999 | Parce et al. | 422/100 |
| 5,885,527 | A | | 3/1999 | Buechler | |
| 5,976,336 | A | | 11/1999 | Dubrow et al. | |
| 6,027,623 | A | * | 2/2000 | Ohkawa | |
| 6,042,709 | A | * | 3/2000 | Parce et al. | 204/453 |
| 6,048,498 | A | * | 4/2000 | Kennedy | 422/99 |
| 6,083,761 | A | * | 7/2000 | Kedar et al. | 436/178 |
| 6,156,273 | A | * | 12/2000 | Regnier et al. | 422/70 |
| 6,180,065 | B1 | * | 1/2001 | Homola | 422/102 |
| 6,254,754 | B1 | * | 3/2001 | Ross et al. | |
| 6,251,343 | B1 | * | 6/2001 | Dubrow et al. | 422/102 |
| 6,270,641 | B1 | * | 8/2001 | Griffiths et al. | 204/451 |
| 6,296,020 | B1 | * | 10/2001 | McNeedy et al. | |

* cited by examiner

FLUID FLOW CONTROL IN CURVED CAPILLARY CHANNELS

BACKGROUND OF THE INVENTION

The present invention is directed to physical structures and methods for controlling the flow of small volumes of liquids such as blood through capillary devices. The present invention is particularly directed to such structures that include curved capillary flow paths and microstructures which can be positioned in the flow path to promote uniform capillary pull around the curve. The present invention also concerns capillary channels that connect to such curved capillary flow paths.

Many diagnostic tests are carried out in the clinical field utilizing a blood sample. It is desirable, when possible, to use a very small volumes of blood, often no more than a drop or two. Capillary structures are often employed when handling such small volumes of blood or other fluids particularly in combination with electrochemical sensors. The capillary structures can be included in analyte sensing apparatus configured in the form of a disposable test strip adapted to cooperate with electrical circuitry of a testing instrument. The test strip generally includes a first defined area to which a biological fluid is to be applied. At least one capillary pathway leads from the first area to one or more second areas containing sensing apparatus such as electrodes or optical windows. Reagent chemical compositions can also be included in one or more of the capillary pathways or second areas containing the sensing electrodes. The testing instrument is A generally programmed to apply a preselected potential to the sensing electrodes at a predetermined time following application of the biological fluid to the first defined area. The current flowing between given pairs of the sensing electrodes through the biological fluid is then measured to provide an indication of the presence and/or concentration of one or more target analytes in the biological fluid. Following the testing, the test strip can be removed from the testing instrument and suitably disposed.

Some electrochemical sensors of this general type include structures intended to promote the transport of plasma, while substantially excluding or inhibiting the passage of erythrocytes to the area or areas containing the sensing electrodes. Example devices are disclosed in U.S. Pat. No. 5,658,444 and in European Patent Application 88303760.8. Other sensors include grooves and other structures designed to direct fluid flow along prescribed paths such as in U.S. Pat. Nos. 4,233,029 and 4,618,476. The test strips including such capillary pathways are generally constructed in a layered geometry as shown, for example, in U.S. Pat. No. 5,798,031.

There is a continuing need for the development of commercially feasible sensors that test for biologically significant analytes. In particular, there is a need for such sensors in which the transport of the biological fluids is controlled as it flows from one location to another. Such flow control could be useful, for example, in the development of structures for sequential or simultaneous testing of a given biological fluid sample for multiple analytes, or repeated tests of given portions of a sample for the same analyte for reliability, or to develop time variant functions of a given analyte interaction. Of particular interest is the development of structures for controlling the capillary flow of liquids in curved pathways and around corners so that the leading edge or meniscus of the fluid remains substantially perpendicular to the walls defining the capillary channel or pathway as the fluid flows toward areas containing the sensing elements and/or reagents.

SUMMARY OF THE INVENTION

A fluid transport structure of the present invention generally includes a capillary pathway having at least one curved portion. The pathway curved portion can be viewed as comprising a base, an inner wall defined by a first radius and an outer wall situated generally parallel to the inner Wall and defined by a second radius greater than the first radius. The inner wall and outer wall are fixed to the base and define the lateral boundaries of the capillary pathway. A lid extends at least from the inner wall to the outer wall to cover the capillary pathway. The capillary pathway includes apparatus facilitating the transport of a liquid longitudinally through the pathway. The apparatus generally comprises at least one group of microstructures fixed to the base that occupy entirely the capillary pathway between the inner and outer walls. The microstructures within each group are generally spaced from each other on a nearest neighbor basis by a first distance that is less than the distance necessary to achieve capillary flow of liquid. Each group of microstructures is confined to a discrete arcuate segment of the curved portion of the capillary pathway, and is spaced from any adjacent group by a distance greater than the first distance.

The microstructures can comprise a variety of shapes. A preferred shape for the microstructures is one of partitions having longitudinal dimensions about equal to the discrete arcuate segment occupied by the group. Each partition is preferably arcuate, but can also be linear, or even zig-zag. Another preferred shape for the microstructures is posts arranged in a triangular close pack configuration. Each posts can have a variety of shapes in cross-section, such as circular, diamond, square, ½ moon, triangle, etc. At least some of the posts adjacent to either of the walls can be joined to the walls by radial extensions. Generally, the microstructures located closer to the inner wall of the curved portion of the capillary pathway are smaller than the microstructures located closer to the outer wall. The microstructures within-each group are preferably centered on centers which are equally spaced from each other.

The fluid transport structure of the present invention can also include at least one capillary channel coupled to the capillary pathway curved portion generally between two adjacent groups of the microstructures. Fluid flow into the capillary channels is generally a function of the lateral dimensions of the capillary channels and can be controlled at least in part by the spacing of the microstructures in the capillary pathway adjacent to the capillary channels. Generally, the walls defining the lateral boundaries of the capillary channels are much closer to each other than are the inner and outer walls of the capillary pathway. To achieve differences in fill times, the walls defining the lateral boundaries of any two capillary channels are generally spaced apart by different distances.

A biological fluid handling structure according to the present invention can be molded as two or more pieces of a thermoplastic resin such as nylon, styrene-acrylic copolymer, polystyrene, or polycarbonate using known micro-injection molding processes. The mold for making the obstructions in the capillary pathway can be constructed by deep reactive ion etching processes typically employed in the manufacture of molds for pre-recorded compact disks and digital video disks. A suitable dry reagent can be situated at desired locations in the structure, if desired. The pieces of the structure are then assembled so that the capillary pathway is enclosed within the structure, yet can be accessed at an inlet port designed to receive a sample of a biological fluid. The apparatus is suitable for use with many types of fluid samples. For example body fluids such as whole blood, blood serum, urine, and cerebrospinal fluid can be applied to the apparatus. Also food products, fermentation products and environmental substances, which potentially contain environmental contaminants, can be applied to the apparatus.

The resulting structure can be viewed as an apparatus including a capillary pathway defined by a base, an inner wall and an outer wall situated generally parallel to the inner wall, the inner wall and outer wall being fixed to the base and defining lateral boundaries of the capillary pathway, and a lid extending at least from the inner wall to the outer wall covering the capillary pathway. The capillary pathway includes one or more groups of microstructures fixed to the base within discrete segments of the pathway for facilitating the transport of a liquid longitudinally through the pathway. At least two capillary channels are coupled between two adjacent groups of microstructures to either the inner and outer wall of the capillary pathway. Each capillary channel includes a pair of side walls defining lateral boundaries of each capillary channel, each pair of side walls of all capillary channels being selectively spaced from each other yet closer to each other than are the inner and outer walls of the capillary pathway, the pair of side walls of one of the capillary channels being spaced apart by a different distance than one other capillary channel. The grouped microstructures are spaced from each other within each group on a nearest neighbor basis by less than a first distance that is less than that necessary to achieve capillary flow of liquid with each group being confined to a discrete arcuate segment of a curved portion of the capillary pathway. Each group of microstructures are spaced from any adjacent group by an inter-group space greater than the width of any of the capillary channels connected to the capillary pathway. Generally, the microstructures are centered on centers which are equally spaced from each other, and microstructures that are located closer to the inner wall of any curve in the capillary pathway are generally smaller than the microstructures located closer to the outer wall. This combination of structural features causes fluids to flow through the capillary pathway so that the rate of flow is somewhat non-uniform as the fluid travels around curved portions of the capillary pathway, the meniscus appearing to momentarily pause at each inter-group space, the flow being somewhat slower near the inner wall of a curved portion than near the outer wall.

Other advantageous features will become apparent upon consideration of the following description of preferred embodiments which references the attached drawings depicting the best mode of carrying out the present invention.

DESCRIPTION OF PREFERRED EMBODIMENTS

Figure 1:
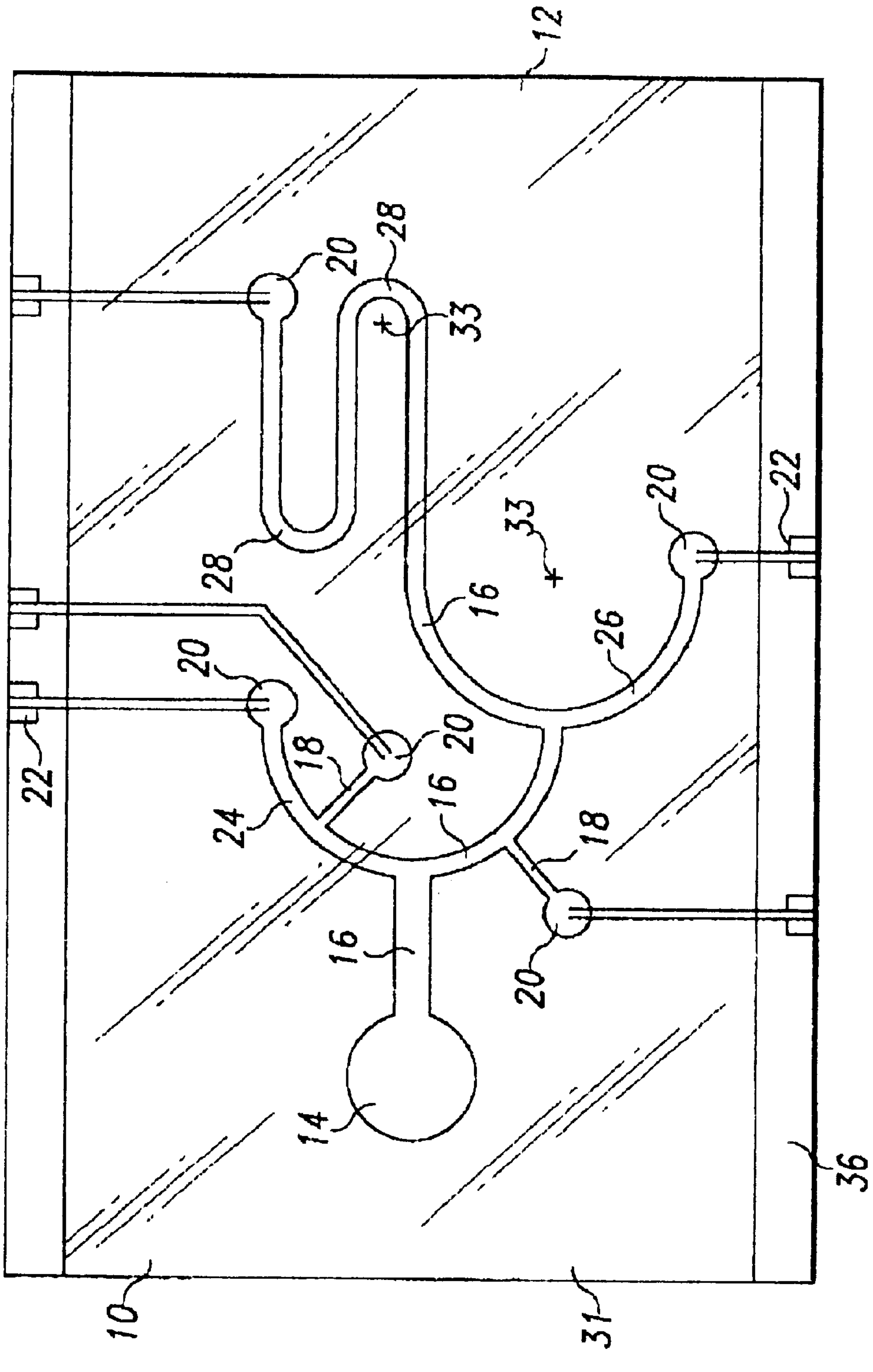
FIG. 1 is a plan view, through a transparent lid, of a capillary structure that includes curved capillary pathways, each of which can include microstructures according to the present invention, and some of which are connected to smaller capillary channels according to the present invention.

A sensor apparatus 10 for testing for biologically significant analytes of an applied biological fluid is shown in FIGS. 1–4, the apparatus being illustrative of the present invention. The sensor apparatus 10 is in the form of an easily disposable test strip 12 that includes a fluid inlet port 14 for receiving a biological fluid to be tested. A pattern of capillary pathways 16 and smaller channels 18 lead to a variety of testing sites 20. Each of the testing sites 20 includes an optical or electrochemical sensor illustrated as pair of electrodes 22 which are shown leading from a testing site 20 to an edge of the test strip 12 to be connected to a suitable testing apparatus, not shown. The variety of testing sites 20, which are connected to the inlet port 14 by a variety of path lengths and widths, permits the sequential or simultaneous testing of a given biological fluid sample for multiple analytes, or the repeated testing of given portions of a sample for the same analyte for reliability, or to develop time variant functions of a given analyte interaction. The capillary pathways 16 include curved portions 24, 26 and 28. The curved portions are of particular interest to the present invention as are the junctions between the curved portions and the smaller capillary channels 18.

Figure 2:
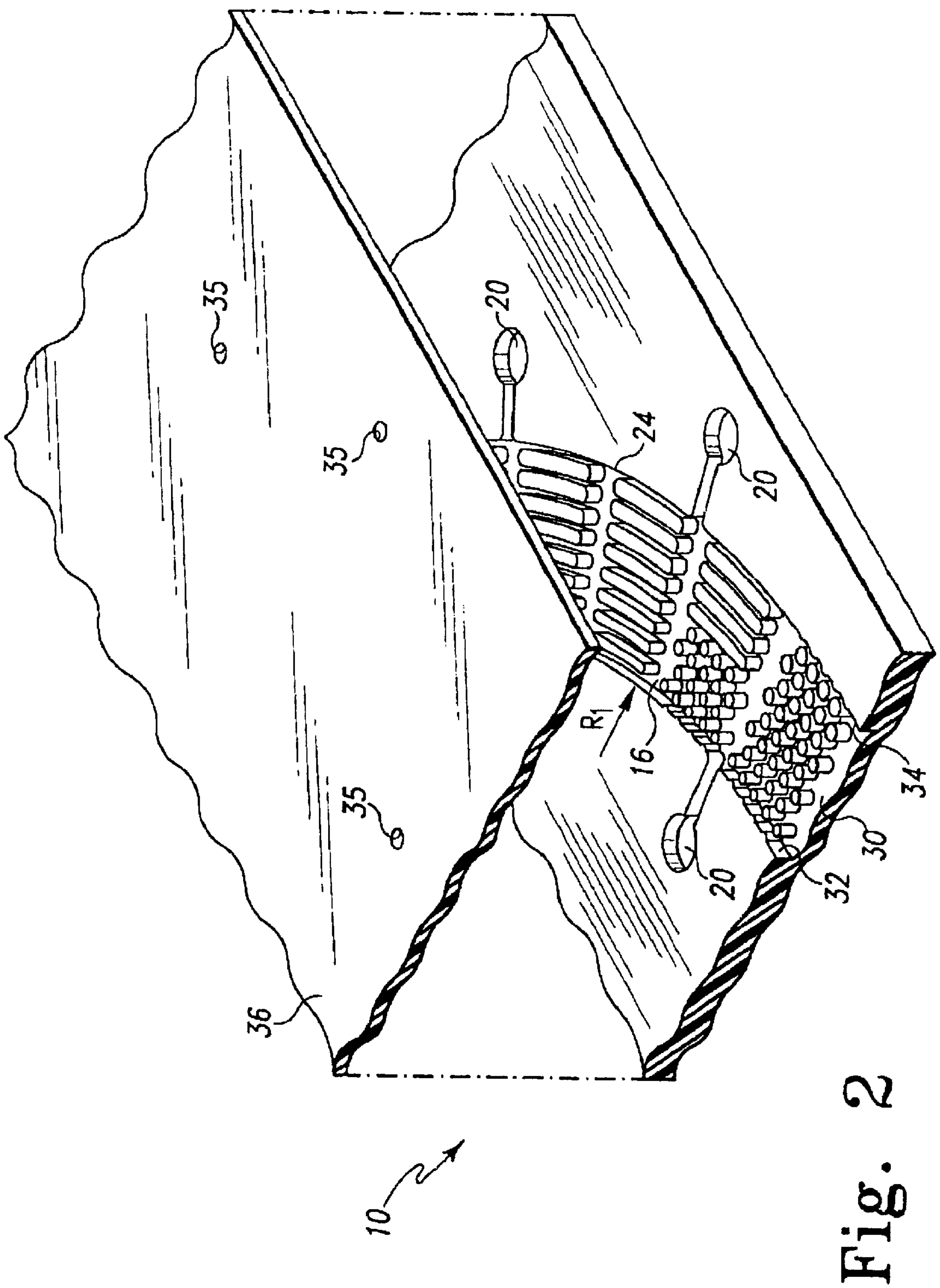
FIG. 2 is an enlarged perspective view of a small portion of the capillary structure shown in FIG. 1.

A perspective view of a portion of the sensor apparatus 10 is shown in FIG. 2. The apparatus 10 is shown to include a capillary pathway 16 having at least one curved portion such as portion 24. The pathway curved portion 24 is defined by a base 30 shown to be a depressed region in a substrate 31, a curved inner wall 32 and a curved outer wall 34. The walls 32 and 34 are generally concentric about, and spaced from, a common center 33 situated at a point interior of the walls 32 and 34. The inner wall 32 and outer wall 34 are fixed to and integral with the base 30 and define the lateral boundaries of the capillary pathway 16. A lid 36, which can be transparent at least over the testing sites 20, extends at least from the inner wall 32 to the outer wall 34, and preferably over the entire substrate 31 to cover the capillary pathway 16. Air vents 35 can be included in the lid 36 or the substrate 31 adjacent the testing sites 20 to permit air to escape from the apparatus as a specimen fluid is pulled into the apparatus by the capillary action.

Figure 5:
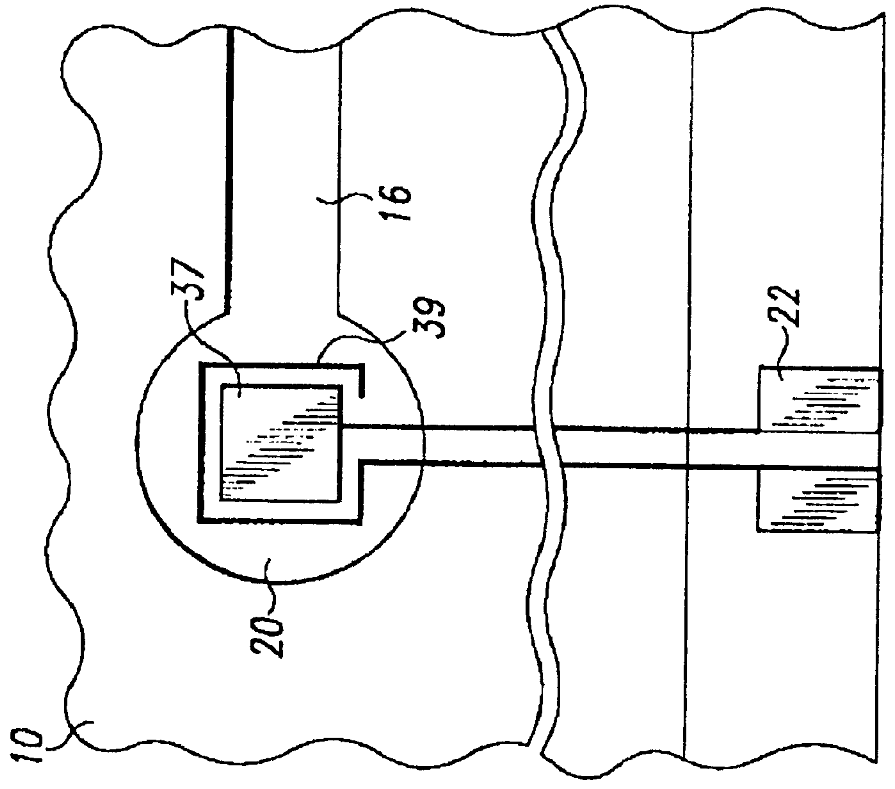
FIG. 5 is an enlarged plan view of a portion of FIG. 1 showing in detail a preferred structure for the electrodes.

Preferably a surface of the lid 36 confronting the substrate 31 carries the electrodes 22 from the various testing sites 20 to an exposed edge of the lid 36 so that the terminal ends of the electrodes 22 project from the edge of the substrate 31. The terminal ends of the electrodes are intended to connect to apparatus such as preprogrammed sensor reading apparatus designed to apply a predetermined potential to the electrodes after a predetermined time interval following delivery of a liquid sample to the inlet port 14. Current flow through the sample can be measured to provide an indication of the presence and/or concentration of a target analyte. A preferred embodiment for the electrodes 22 is illustrated in FIG. 5 comprising a central electrode 37, which is shown to be square but could also be round or another convenient shape, and a peripheral electrode 39 substantially surrounding the central electrode 37. The electrodes 22 can be formed by standard lithography processes commonly used in the semi-conductor industry. As an alternative to the electrodes 22, the transparent character of the lid 36 at least over the testing sites 20 permits an optical sensor, not shown, to observe the sample interaction with a reagent to provide an indication of the presence and/or concentration of a target analyte.

Figure 3:
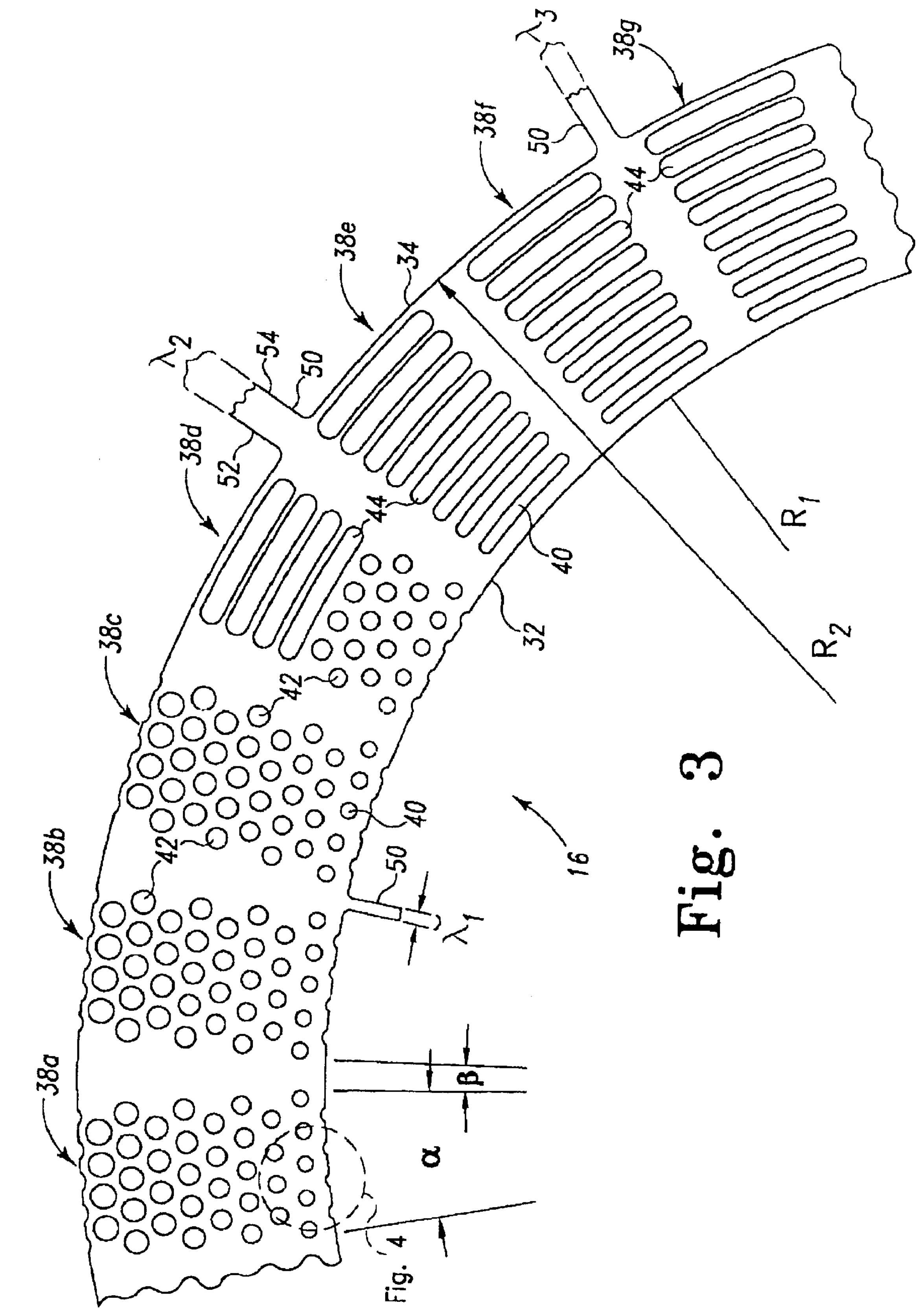
FIG. 3 is detail plan view of a portion of the capillary pathway shown in FIG. 1 showing two preferred embodiments for the microstructures.
Figure 4:
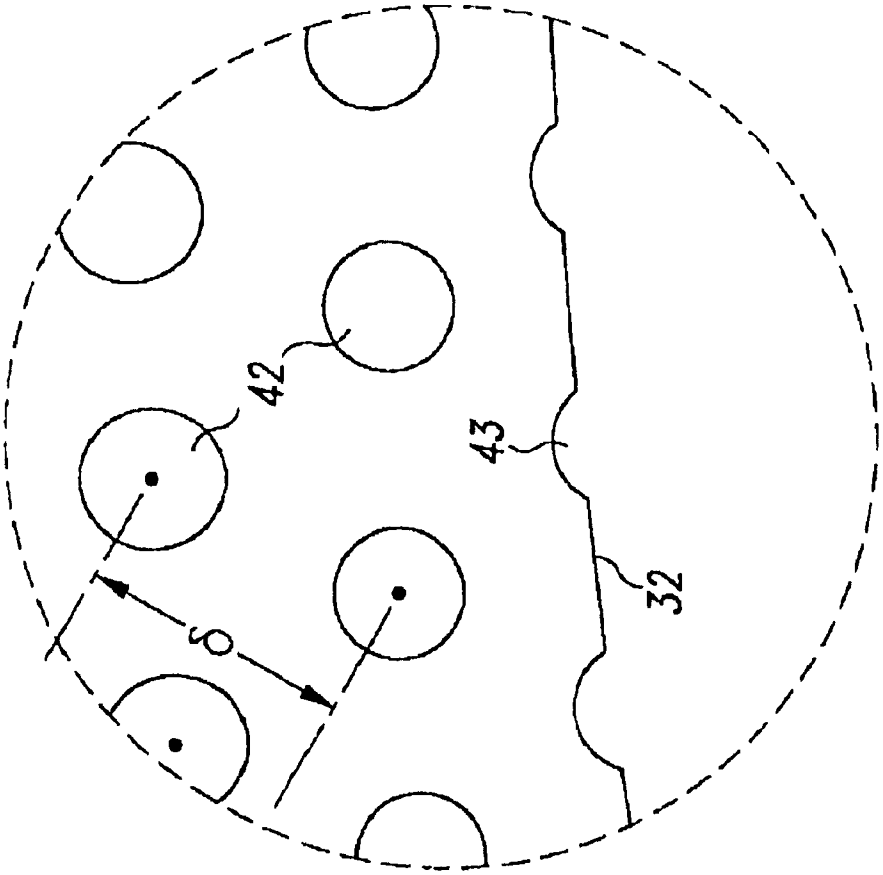
FIG. 4 is further enlarged detail view of a portion of the capillary pathway showing a feature of one wall of a curved portion of the capillary pathway.

The capillary pathway 16 includes apparatus facilitating the transport of a liquid longitudinally through the pathway. The apparatus is shown in FIGS. 2–4 and generally comprises groups 38*a*–38*g* of microstructures 40 fixed to the base 30 that generally occupy the entire width of the capillary pathway between the inner and outer walls 32 and 34, respectively defined by radii $R_1$ and $R_2$. The microstructures 40 within each group 38 are shown to be of two general types, posts 42 and fences 44. The microstructures 40 are generally spaced from each other, on a nearest neighbor basis, by a first distance that is less than the distance necessary to achieve capillary flow of liquid between the microstructures. Each group 38 of microstructures 40 is confined to a discrete arcuate segment $\alpha$ of the curved portion of the capillary pathway, and is spaced from any adjacent group by an inter-group space of distance $\beta$. Typically the arcuate segment $\alpha$ is a minor portion of the arc involved in the curved portion, of about 5° to 15°. With shorter radius curved portions, the arcuate segment $\alpha$ will generally occupy a larger portion of the arc. The inter-group space distance $\beta$ is generally smaller than $\alpha$, yet larger than the spacing between adjacent microstructures 40 within any single group 38.

The microstructures 40 can comprise a variety of shapes. A preferred shape for the microstructures is as arcuate partitions 44 having longitudinal dimensions about equal to the discrete arcuate segment $\alpha$ occupied by the group 38 containing the partitions 44 as shown in groups 38*d* through 38*g*. Another preferred shape for the microstructures 40 is as round posts 42 arranged in a triangular close pack configuration as shown in groups 38*a* through 38*d*. At least some of the posts 43 adjacent to either of the walls 32 or 34 can be joined to the walls as shown in FIG. 4. Generally, the microstructures 40 located closer to the inner wall 32 of the curved portion of the capillary pathway 16 are smaller than the microstructures located closer to the outer wall 34. The microstructures 40 within each group are preferably centered on centers which are equally spaced from each other by a center separation distance $\delta$.

The fluid transport structure of the present invention can also include capillary channels 50 coupled to the capillary pathway 16 generally between two adjacent groups 38 of the microstructures 40. Fluid flow into the capillary channels 50 is generally a function of the lateral dimensions $\lambda$ of the capillary channels. The fluid flow can be controlled at least in part by the spacing of the microstructures 40 in the capillary pathway 16 adjacent to the capillary channels 50. Generally, the walls 52 and 54 defining the lateral boundaries of the capillary channels 50 are much closer to each other than are the inner and outer walls 32 and 34 of the capillary pathway 16. To achieve differences in fill times, the walls 52 and 54 defining the lateral boundaries of any two capillary channels are generally spaced apart by different distances $\lambda_1$, $\lambda_2$, and $\lambda_3$.

A biological fluid handling structure according to the present invention can be molded as one or two or more pieces of a thermoplastic resin. Suitable resins include thermoplastics such acrylonitrile butadine styrene (ABS), acetal, acrylic, polycarbonate (PC), polyester, polyethylene, fluroplastic, polimide, nylon, polyphenylene oxide, polypropylene (PP) styrene-acrylic copolymer, polystyrene, polysulphone, polyvinyl chloride, poly(methacrylate), poly (methyl methacrylate), or polycarbonate, or mixtures or copolymers thereof. More preferably, the substrate 31 includes a polycarbonate, such as those used in making compact discs. Specific examples of polycarbonates include MAKROLON 2400 from Bayer AG of Leverkusen, Germany, and NOVAREX 7020 HF from Mitsubishi Engineering-Plastics Corporation of Tokyo, Japan. Most preferably, the substrate 31 does not contain any reinforcing material, and only contains a thermoplastic material such as polycarbonate. The lid 36 and substrate 31 can be formed using known micro-injection molding processes. The mold for making the obstructions in the capillary pathway can be constructed by deep reactive ion etching processes typically employed in the manufacture of molds for pre-recorded compact disks and digital video disks. A suitable dry reagent can be situated at desired locations in the structure, if desired. The pieces of the structure are then assembled so that the capillary pathway 16 is enclosed within the structure, yet can be accessed at an inlet port 14 designed to receive a sample of a fluid having a volume of 100 $\mu$l or less, more typically having a volume of about 5–10 $\mu$l, and preferably having a volume of about 2–3 $\mu$l.

Although the present invention has been described by reference to the illustrated preferred embodiment, it will be appreciated by those skilled in the art that certain changes and modifications can be made within the scope of the invention as defined by the appended claims.

What is claimed is:

1. A capillary pathway having at least one curved portion, the pathway curved portion comprising a base, an inner wall defined by a first radius from a center point and an outer wall generally concentric about the center point and defined by a second radius greater than the first radius, the inner wall and outer wall being fixed to the base and defining lateral boundaries of the capillary pathway, and a lid extending at least from the inner wall to the outer wall covering the capillary pathway, the capillary pathway including apparatus facilitating the transport of a liquid longitudinally through the pathway comprising:

a plurality of groups of microstructures fixed to the base in the capillary pathway between the inner and outer walls, the microstructures of each group being spaced from each other on a nearest neighbor basis by less than a first distance that is less than that necessary to achieve capillary flow of liquid, each group being confined to a discrete arcuate segment of the at least one curved portion of the capillary pathway, each group being spaced from any adjacent group by a second distance greater than the first distance defining a longitudinal segment of the capillary pathway.

2. The apparatus of claim 1 wherein at least some of the microstructures within at least one of the groups comprises arcuate partitions having longitudinal dimensions about equal to the discrete arcuate segment occupied by the at least one group.

3. The apparatus of claim 1 wherein at least some of the microstructures within at least one of the groups comprises posts.

4. The apparatus of claim 3 wherein the posts arranged in a uniformly spaced triangular close pack configuration.

5. The apparatus of claim 4 wherein at least some of the posts adjacent to either of the walls are joined to the walls.

6. The apparatus of claim 1 wherein the microstructures adjacent to the inner and outer walls are separated from the adjacent walls by a distance less than said first distance.

7. The apparatus of claim 1 wherein the microstructures located closer to the inner wall are smaller than the microstructures located closer to the outer wall.

8. The apparatus of claim 7 wherein the microstructures are centered on centers which are equally spaced from each other.

9. The apparatus of claim 7 further comprising at least one capillary channel coupled to the capillary pathway curved portion between two adjacent groups of the microstructures.

10. The apparatus of claim 9 wherein walls defining lateral boundaries of the at least one capillary channel are closer to each other than are the inner and outer walls of the capillary pathway.

11. The apparatus of claim 10 wherein there are at least two capillary channels coupled to the capillary pathway.

12. The apparatus of claim 11 wherein the walls defining the lateral boundaries of the at least two capillary channels are spaced apart by different distances.

13. A capillary pathway having at least one curved portion, the pathway curved portion comprising a base, an inner wall defined by a first radius from a center point and an outer wall defined by a second radius from the center point greater than the first radius, the inner wall and outer wall being fixed to the base and defining lateral boundaries of the capillary pathway, and a lid extending at least from the inner wall to the outer wall covering the capillary pathway, the capillary pathway including apparatus facilitating the transport of a liquid longitudinally through the pathway comprising:

groups of microstructures fixed to the base of the capillary pathway between the inner and outer walls, the microstructures of each group being spaced from each other on a nearest neighbor basis by less than a first distance that is less than that necessary to achieve capillary flow of liquid, each group being confined to a discrete arcuate segment of the at least one curved portion of the capillary pathway, each group being spaced from any adjacent group by a second distance greater than the first distance defining a longitudinal segment of the capillary pathway.

14. The apparatus of claim 13 further comprising at least one capillary channel coupled to one of the inner and outer wall of the capillary pathway curved portion between two adjacent groups of microstructures.

15. The apparatus of claim 13 wherein the microstructures adjacent to the inner and outer walls are separated from the adjacent walls by a distance less than said first distance.

16. The apparatus of claim 13 wherein walls defining lateral boundaries of the at least one capillary channel are closer to each other than are the inner and outer walls of the capillary pathway.

17. The apparatus of claim 16 wherein there are at least two capillary channels coupled to the capillary pathway.

18. The apparatus of claim 17 wherein the walls defining the lateral boundaries of the at least two capillary channels are spaced apart by different distances.

19. The apparatus of claim 13 wherein at least some of the microstructures within at least one of the groups comprises arcuate partitions having longitudinal dimensions about equal to the discrete arcuate segment occupied by the at least one group.

20. The apparatus of claim 13 wherein at least some of the microstructures within at least one of the groups comprises posts arranged in a uniformly spaced triangular close pack configuration.

21. The apparatus of claim 20 wherein at least some of the posts adjacent to either of the inner and outer walls are joined to the walls.

22. The apparatus of claim 21 wherein the microstructures located closer to the inner wall are smaller than the microstructures located closer to the outer wall.

23. The apparatus of claim 22 wherein the microstructures are centered on centers which are equally spaced from each other.

* * * * *